(12) United States Patent
de Palma et al.

(10) Patent No.: US 8,717,726 B2
(45) Date of Patent: May 6, 2014

(54) STATIC SURGE PROTECTION DEVICE

(75) Inventors: Jean-Francois de Palma, Arlington, MA (US); Jerry L. Mosesian, Newburyport, MA (US)

(73) Assignee: Mersen USA Newburyport-MA, LLC, Newburyport, MA (US)

( * ) Notice: Subject to any disclaimer, the term of this patent is extended or adjusted under 35 U.S.C. 154(b) by 511 days.

(21) Appl. No.: 13/117,654

(22) Filed: May 27, 2011

(65) Prior Publication Data
US 2012/0300352 A1 Nov. 29, 2012

(51) Int. Cl.
*H02H 9/00* (2006.01)

(52) U.S. Cl.
USPC .......................................... 361/91.5

(58) Field of Classification Search
USPC .......................................... 361/91.5
See application file for complete search history.

(56) References Cited

U.S. PATENT DOCUMENTS

| | | | | |
|---|---|---|---|---|
| 3,748,401 | A | * | 7/1973 | Pesz et al. ..................... 379/382 |
| 3,947,726 | A | | 3/1976 | DeCecco et al. ............... 317/16 |
| 4,232,351 | A | | 11/1980 | Baker ............................ 361/56 |
| 4,358,729 | A | | 11/1982 | Hart .............................. 323/322 |
| 4,475,139 | A | | 10/1984 | Chadwick ..................... 361/91 |
| 4,843,515 | A | * | 6/1989 | Richman ....................... 361/58 |
| 4,878,145 | A | | 10/1989 | Lace ............................. 361/118 |
| 6,118,256 | A | | 9/2000 | Wilson .......................... 320/166 |
| 6,226,166 | B1 | * | 5/2001 | Gumley et al. ................ 361/118 |
| 6,567,254 | B2 | | 5/2003 | Bentley ......................... 361/111 |
| 6,680,839 | B2 | | 1/2004 | Napiorkowski ............... 361/119 |
| 6,775,121 | B1 | | 8/2004 | Chaudhry ..................... 361/111 |
| 7,312,970 | B2 | | 12/2007 | Skinner ......................... 361/111 |
| 7,782,588 | B2 | | 8/2010 | Liao .............................. 361/118 |
| 2005/0041356 | A1 | | 2/2005 | Storm et al. ................... 361/118 |

OTHER PUBLICATIONS

Clark et al., "Series 102—An Introduction to Transient Voltage Suppressor Devices," MicroNote 102, Copyright Microsemi Corporation 1996, www.microsemi.com/micnotes/100ser/102.htm, last accessed Apr. 20, 2011.

Littelfuse®, "Littelfuse Varistors—Basic Properties, Terminology and Theory," Application Note, Jul. 1999, AN9767.1, Copyright © Littelfuse, Inc. 1999, pp. 10-89 to 10-101.

Littelfuse®, "The ABCs of MOVs," Application Note, Jul. 1999, AN9311.6, Copyright © Littelfuse, Inc. 1999, pp. 10-46 to 10-48.

(Continued)

*Primary Examiner* — Stephen W Jackson
(74) *Attorney, Agent, or Firm* — Kusner & Jaffe (57) ABSTRACT

A surge protection device that includes varistors to absorb surge currents and protect a load from an overvoltage condition. The surge protection device includes a combination of switching elements and diodes. The surge protection device includes a basic cell design that can be easily adapted for higher voltage applications and/or higher discharge current applications and/or higher energy applications by parallel and/or series combinations of the basic cell design. Operation of the device minimizes fatigue to the varistors, thereby extending their useful life. The surge protection device achieves a better ratio of MOV clamping voltage rating versus MOV maximum continuous AC voltage rating, as compared with a conventional MOV installed alone.

20 Claims, 5 Drawing Sheets

(56) References Cited

OTHER PUBLICATIONS

Harris, Suppression Products, Surge Suppression Technologies for AC Mains Compared (MOVs, SADs, Gas Tubes, Filters and Transformers), Application Note, Jan. 1998, AN9310.1, Copyright © Littelfuse, INc. 1998, pp. 10-41 to 10-45.

Littelfuse®, "Varistor Testing," Application Note, Jul. 1998, AN9773, Copyright © Littelfuse, Inc. 1998, pp. 10-141 to 10-148.

Bruno van Beneden, Vishay BCcomponents, Malvern, Pa, "Varistors: Ideal Solution to Surge Protection," Power Electronics Technology, May 2003, www.powerelectronics.com, pp. 26-30.

Martzloff et al., "Selecting Varistor Clamping Voltage: Lower is Not Better!," National Institute of Standards and Technology, Reprinted from the proceedings of the 1989 Zürich International EMC Symposium, pp. 137-142.

Harnden Jr., et al., "Metal-oxide varistor: a new way to suppress transients," Copyright 1972 by McGraw-Hill Inc., Reprinted from Electronics, Oct. 9, 1972.

* cited by examiner

STATIC SURGE PROTECTION DEVICE

FIELD OF THE INVENTION

The present invention relates generally to the field of surge protection, and more particularly to a surge protection device that includes varistors.

BACKGROUND OF THE INVENTION

Many surge protection devices utilize varistors (also known as voltage dependent resistors or VDRs) as the main component for diverting electrical disturbances associated with industrial distribution equipment. A varistor is an electronic component with a "diode-like" nonlinear current-voltage characteristic. The basic function of a varistor is to conduct significantly increased current when voltage is excessive, while limiting residual voltage to protect circuits. Varistors are often used to protect circuits against excessive transient voltages by incorporating them into the circuit in such a way that, when triggered, they will shunt the current created by a high voltage away from sensitive components.

The most common type of varistor is a metal oxide varistor (MOV). An MOV contains a ceramic mass of zinc oxide grains in a matrix of other metal oxides (such as small amounts of bismuth, cobalt, manganese) sandwiched between two metal plates (the electrodes). The boundary between each grain and its neighbor forms a diode junction, which allows current to flow in only one direction. The mass of randomly oriented grains is electrically equivalent to a network of back-to-back diode pairs, each pair in parallel with many other pairs. When low voltage is applied across the electrodes, only a tiny current flows, caused by reverse leakage through the diode junctions. Accordingly, the MOV will look like an open circuit. When the voltage applied across the electrodes exceeds the MOVs "maximum continuous voltage" (MCOV) rating, the diode junction breaks down due to a combination of thermionic emission and electron tunneling, and a large current flows. The result of this behavior is a highly-nonlinear current-voltage characteristic in which the MOV acts as an insulator (high resistance) at low voltages and acts as a conductor (low resistance) for transients that exceed the MOV's maximum continuous voltage.

The maximum continuous voltage rating defines maximum AC or DC voltage that can be applied before the MOV begins to conduct. Once the maximum continuous voltage is exceeded the MOV begins to heat as conduction current flows. In this state, the MOV will eventually have a catastrophic failure due to thermal runaway. To address this problem, surge protection device (SPD) manufacturers have incorporated thermo-mechanical disconnection systems to disconnect the MOV from the supply voltage before it fails. However, there is a limitation to the use of thermo-mechanical disconnection systems that relates to the magnitude of excess voltage that can be applied. If the voltage is sufficiently high enough, the heating of the MOV occurs too quickly to allow the thermo-mechanical disconnection system to react. This is due to the rate of conduction current rise (di/dt). In this regard, the current cannot be dissipated through the MOV and "hot spots" or areas of concentrated current density rapidly form in the MOV, thereby causing a puncturing of the MOV.

Moreover, while MOVs offer low costs and relatively high transient energy absorption capability, MOVs progressively degrade with repetitive stress. Accordingly, an MOV will age quicker with more frequent activation. In a typical surge protection device, at least one MOV is employed per mode of protection and sometimes two or more MOVs are used in parallel to achieve higher surge current ratings. The MOV maximum continuous voltage rating is selected to provide maximum protection. However, the MOV maximum continuous voltage rating must be sufficiently high enough relative to the system voltage so that the MOV is only active during a surge event. If the MOV is activated when there is no surge event, then the MOV will age more quickly due to fatigue. One common design convention is to select an MOV having a maximum continuous voltage rating of 115% of nominal system voltage to avoid unwarranted activation.

The present invention provides a new and improved surge protection device that solves the problems described above and overcomes drawbacks of prior art solutions, such as use of gas discharge tubes (GDTs) or crowbar circuits comprising zener diodes and silicon-controlled rectifiers (SCRs) (also known as a thyristor).

The present invention provides a new solution to the problem described above, and provides advantages that are not found in existing prior art solutions.

SUMMARY OF THE INVENTION

In accordance with the present invention, there is provided a surge protection device comprising: a surge protection circuit including: a first pair of series-connected varistors; a first pair of series-connected diodes, wherein said pair of diodes are connected with opposite polarity; and a first switching element connected at a first end between the first pair of series-connected varistors and at a second end between the first pair of series-connected diodes.

In accordance with another aspect of the present invention, there is provided a surge protection device comprising: a first surge protection circuit including: three series-connected varistors; first, second and third series-connected diodes, wherein second series connected diode is connected at a first end to the first series-connected diode and connected at a second end to the third series connected diode, said second series-connected diode having a polarity opposite the polarity of said first and third series-connected diodes; a first switching element connected at a first end between the first and second series-connected diodes and connected at a second end between the first and second series-connected varistors; and a second switching element connected at a first end between the second and third series-connected varistors and connected at a second end between the second and third series-connected diodes.

In accordance with still another aspect of the present invention, there is provided a surge protection device comprising: (1) a first surge protection circuit including: a first pair of series-connected varistors; a second pair of series-connected varistors; a first pair of series-connected diodes, wherein said pair of diodes are connected with opposite polarity; a first switching element connected at a first end between the first pair of series-connected varistors and at a second end between the first pair of series-connected diodes; and a second switching element connected at a first end between the first pair of series-connected diodes and at a second end between the second pair of series-connected varistors, wherein the first and second switching elements have opposite polarity; and (2) a second surge protection circuit including: a first pair of series-connected varistors; a second pair of series-connected varistors; a first pair of series-connected diodes, wherein said first pair of diodes are connected with opposite polarity and have a polarity that is reverse of said first pair of diodes of said first surge protection circuit; a first switching element connected at a first end between the first pair of series-connected varistors and at a second end between the first pair of series-connected diodes; and a second switching element connected at a first end between the first pair of series-connected diodes and at a second end between the second pair of series-connected varistors, wherein the first and second switching elements have opposite polarity, and a polarity reverse of said first and second switching elements of said first surge protection circuit, wherein a plurality of said first protection circuits connected in an alternating fashion with a plurality of second surge protection circuits, wherein adjacent first and second surge protection circuits share one of said varistors of said first pair of series-connected varistors, one of said varistors of said second pair of series-connected varistors, and one of said diodes of said first pair of series-connected diodes.

An advantage of the present invention is the provision of a surge protection device that protects a load from transient overvoltages.

Another advantage of the present invention is the provision of a surge protection device that does not have follow-on current.

Still another advantage of the present invention is the provision of a surge protection device that is adaptable to address preprogrammed trip levels, required voltage or maximum current capacity, and variable surge current levels.

Still another advantage of the present invention is the provision of surge protection device that minimizes fatigue to varistors.

Yet another advantage of the present invention is the provision of a surge protection device that achieves a better ratio of MOV clamping voltage rating versus MOV maximum continuous AC voltage rating, as compared with a conventional MOV installed alone.

Yet another advantage of the present invention is the provision of a surge protection device that has a basic cell design that can be easily adapted for higher voltage applications and/or higher discharge current applications and/or higher energy applications by parallel and/or series combinations of the basic cell design.

A still further advantage of the present invention is the provision of a surge protection device that includes modular circuits that can be arranged in series or parallel configurations to achieve needed voltage or maximum current capacity, thereby providing greater flexibility to the system designer seeking to reduce manufacturing costs.

These and other advantages will become apparent from the following description taken together with the accompanying drawings and the appended claims.

BRIEF DESCRIPTION OF THE DRAWINGS

The invention may take physical form in certain parts and arrangement of parts, an embodiment of which will be described in detail in the specification and illustrated in the accompanying drawings which form a part hereof, and wherein.

DETAILED DESCRIPTION OF THE INVENTION

Figure 1:
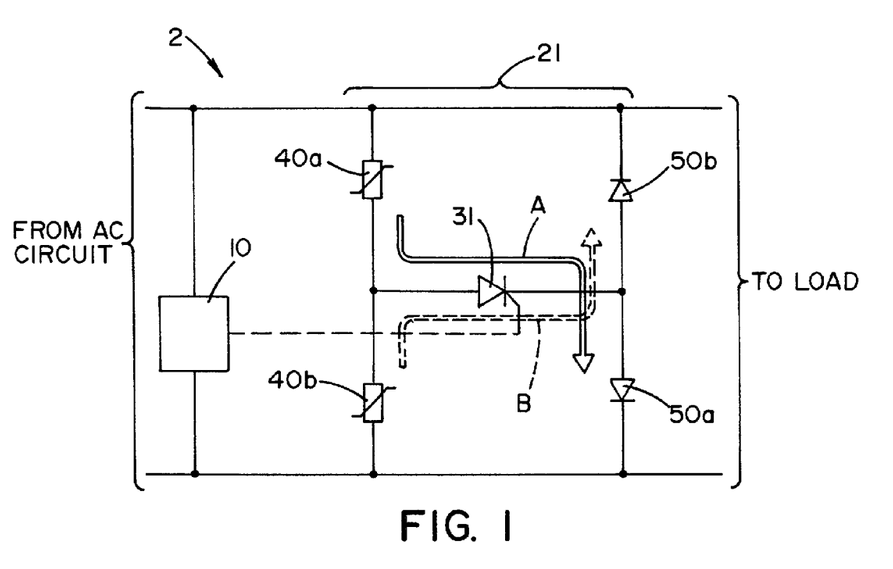
FIG. 1 is a schematic illustrating a static surge protection device having a surge protection circuit according to a first embodiment ("basic cell" design)

Referring now to the drawings wherein the showings are for the purposes of illustrating embodiments of the invention only and not for the purposes of limiting same, FIG. 1 shows a static surge protection device 2 comprised of a driver circuit 10 and a surge protection circuit 21 according to a first embodiment (basic cell design). Device 2 is shown connected between an AC circuit (power line) and a load that requires surge protection.

In one embodiment of the present invention, driver circuit 10 may take the form of an overvoltage crowbar sensing circuit.

Circuit 21 is generally comprised of a pair of series-connected varistors 40a and 40b, a pair of series-connected diodes 50a and 50b (connected with opposite polarity), and a switching element (in the form of a thyristor 31) connected between varistors 40a, 40b and diodes 50a, 50b. More specifically, thyristor 31 is connected at a first end between the pair of series-connected varistors 40a, 40b and connected at a second end between the pair of series-connected diodes 50a, 50b Driver circuit 10 is used to activate (i.e., turn "on") thyristor 31, as will be described below.

As indicated above, the switching element takes the form of a thyristor-type semiconductor (also referred to as a silicon controlled rectifier or SCR) in the illustrated embodiment. However, it is also contemplated that switching element may take other suitable forms, including but not limited to, a gas discharge tube (GDT), or crowbar circuits having zener diodes and SCR. It should be further appreciated that the thyristor-type semiconductor may be selected from a thyristor family, including but not limited to, gate turn-off thyristor (GTO), reverse conducting thyristor (RCT), MOS-controlled thyristor, etc.

A thyristor has a gate, an anode and a cathode. When a small amount of current flows into the gate, this allows a larger current to flow from the anode to the cathode. Even when the current into the gate stops, the thyristor continues to allow current to flow from the anode to cathode. More specifically, in the normal "off" state of the thyristor, the current flow is restricted to the leakage current (e.g., <0.1 mA). When the gate-to-cathode voltage exceeds a certain threshold, the thyristor turns "on" (i.e., activated state) and conducts current from the anode to the cathode. The thyristor remains in the "on" state even after gate current is removed, so long as current through the thyristor remains above a "holding current." The holding current is the minimum amount of load current that is required to hold the thyristor latched in the "on" state. Once current falls below the holding current for an appropriate period of time, the thyristor switches "off." Typical holding current values range from 1 milliamp to 50 milliamps or more.

In the illustrated embodiment, varistors 40a and 40b take the form of metal oxide varistors (MOVs). When a small or moderate voltage is applied across the electrodes of a varistor, only a small current flows through the varistor. When a large voltage is applied across the electrodes of a varistor, a large current flows through the varistor. Accordingly, a varistor has a highly-nonlinear current-voltage characteristic, in which the varistor has a high resistance at low voltages and a low resistance at high voltages. When the varistor is in a conducting state, surge energy is absorbed and the voltage across the varistor is limited or "clamped" to a given voltage level that is relative to the magnitude of surge current being observed.

Figure 2A:
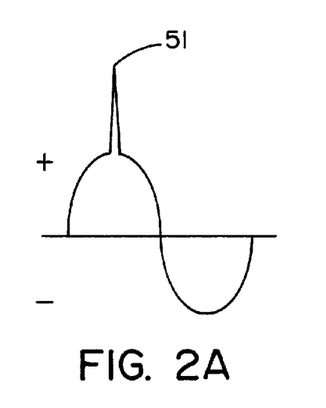
FIG. 2A shows an AC voltage waveform with a positive voltage surge at 90 degrees.

Operation of device 2 will now be described in detail. During normal operating conditions, the AC circuit "sees" varistors 40a, 40b in series. Varistors 40a, 40b are in a high resistance mode, and thus appear as an open circuit. When driver circuit 10 detects a positive voltage surge (S1), e.g., as illustrated in FIG. 2A (depicted at 90 degrees, but the surge may occur at any point on the waveform), driver circuit 10 turns on thyristor 31. Consequently, current conducts through varistor 40a, thyristor 31 and diode 50a, as shown by current flow path A. In this regard, varistor 40a conducts current because the AC circuit voltage is equal to or exceeds the varistor maximum continuous voltage (MCOV). Diode 50a also conducts current since it is forward biased. Since the current follows the path of least resistance, current does not flow through varistor 40b. When the current flowing through thyristor 31 is at or near zero, thyristor 31 automatically turns off. Consequently, the AC circuit will again "see" varistors 40a and 40b in series.

Figure 2B:
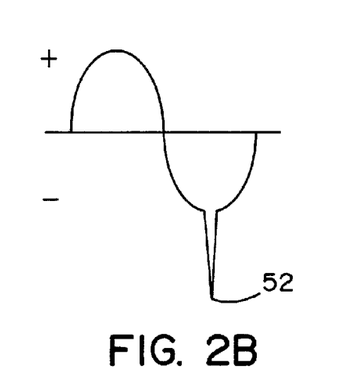
FIG. 2B shows an AC voltage waveform with a negative voltage surge at 90 degrees.

Circuit 21 responds in a similar fashion when driver circuit 10 detects a negative voltage surge (S2), e.g., as illustrated in FIG. 2B (depicted at 90 degrees, but the surge may occur at any point on the waveform). In this regard, driver circuit 10 turns on thyristor 31 causing current to conduct through varistor 40b, thyristor 31 and diode 50b, as shown by current flow path B. Varistor 40b conducts current because the AC circuit voltage is equal to or exceeds the varistor maximum continuous voltage (MCOV) and diode 50b also conducts current since it is forward biased. Since the current follows the path of least resistance, current does not flow through varistor 40a. When the current flowing through thyristor 31 is at or near zero, thyristor 31 automatically turns off, and the AC circuit again "sees" varistors 40a and 40b in series.

Circuit 21 diverts transient current surges through current flow path A or current flow path B, thereby protecting the load. Only one of the two varistors 40a, 40b is activated during a surge event, thereby resulting in less fatigue to each of the varistors 40a, 40b. In other words, the fatigue is shared by each of the varistors 40a, 40b, since only varistor 40a is activated in the event of a positive voltage surge and varistor 40b is activated only in the event of a negative voltage surge. Accordingly, only one of the two varistors 40a, 40b is activated for every positive and negative voltage surge. Thus, during normal operation there are two (2) varistors (i.e., varistors 40a and 40b) in series so there is no fatigue, but when an event (such as a voltage surge) is detected, the switching element (e.g., thyristor 31) is triggered and only one (1) varistor (i.e., varistor 40a or varistor 40b) is turned on to provide "clamping."

Figure 3:
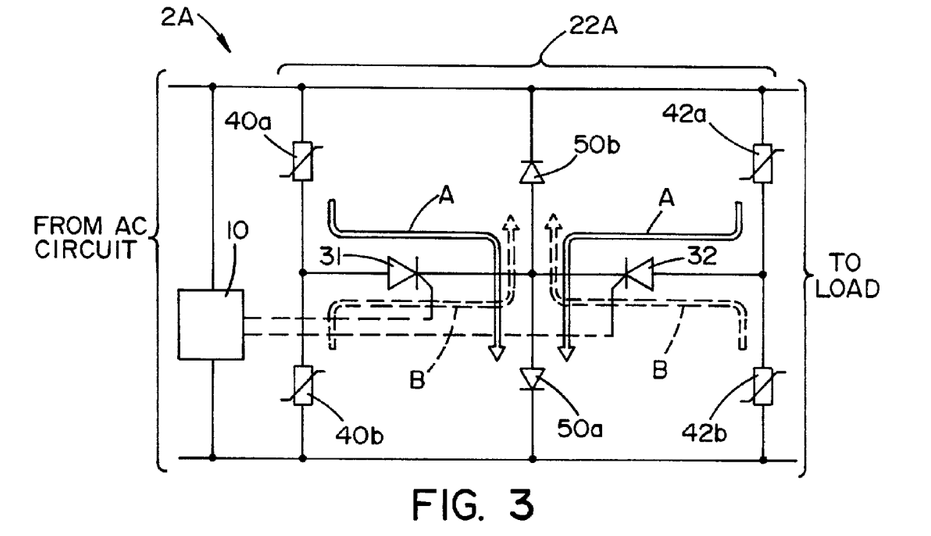
FIG. 3 is a schematic illustrating a static surge protection device having a surge protection circuit according to a second embodiment, wherein the second embodiment is an expanded version of the first embodiment to provide increased energy dissipation capacity.

Referring now to FIG. 3, there is shown a static surge protection device 2A comprised of a driver circuit 10 and a surge protection circuit 22A according to a second embodiment. Circuit 22A is an expanded version of circuit 21 that increases (i.e., doubles) the amount of energy that can be dissipated. Circuit 22A is generally comprised of first and second pairs of series-connected varistors 40a, 40b and 42a, 42b, a pair of series-connected diodes 50a and 50b (connected with opposite polarity), and a pair of switching elements in the form of thyristors 31 and 32. Thyristor 31 is connected between varistors 40a, 40b and diodes 50a, 50b, while thyristor 32 is connected between diodes 50a, 50b and varistors 42a, 42b. More specifically, thyristor 31 is connected at a first end between the first pair of series-connected varistors 40a, 40b and at a second end between the pair of series-connected diodes 50a, 50b. Thyristor 32 is connected at a first end between the pair of series-connected diodes 50a, 50b and at a second end between the second pair of series-connected varistors 42a, 42b.

Operation of circuit 22A will now be described in detail. During normal operating conditions, the AC circuit "sees" series-connected varistors 40a, 40b and series-connected varistors 42a, 42b in parallel. When driver circuit 10 detects a positive voltage surge (S1), e.g., as illustrated in FIG. 2A, driver circuit 10 turns on thyristors 31 and 32. Consequently, current conducts through (1) varistor 40a, thyristor 31 and diode 50a, and (2) varistor 42a, thyristor 32 and diode 50a, as shown by current flow paths A. Accordingly, the surge current is divided between varistors 40a and 42a. When the current flowing through thyristors 31 and 32 is at or near zero, thyristors 31 and 32 automatically turn off. Consequently, the AC circuit will again "see" series-connected varistors 40a, 40b and series-connected varistors 42a, 42b in parallel.

Circuit 22A responds in a similar fashion when driver circuit 10 detects a negative voltage surge (S2), e.g., as illustrated in FIG. 2B. In this regard, driver circuit 10 turns on thyristors 31 and 32 causing current to conduct through (1) varistor 40b, thyristor 31 and diode 50b, and (2) varistor 42b, thyristor 32 and diode 50b, as shown by current flow paths B. Accordingly, the surge current is divided between varistors 40b and 42b. When the current flowing through thyristors 31 and 32 is at or near zero, thyristors 31 and 32 automatically turns off, and the AC circuit again "sees" series-connected varistors 40a, 40b and series-connected varistors 42a, 42b in parallel.

By dividing the current between a pair of varistors during a voltage surge, the amount of energy that can be dissipated by circuit 22A (FIG. 3) is double the amount of energy that can be dissipated by circuit 21 (FIG. 1), using all varistors of the same maximum continuous voltage rating.

Figure 4:
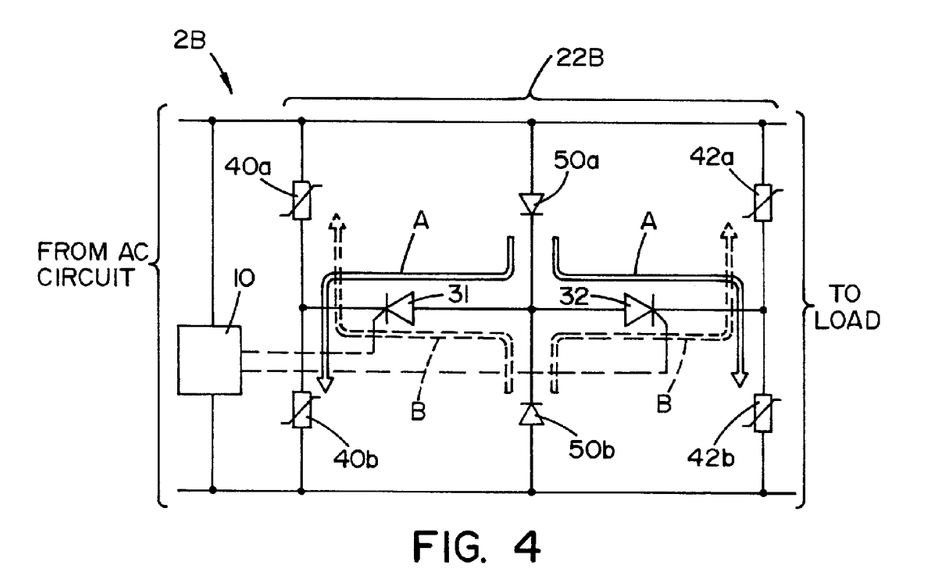
FIG. 4 is schematic illustrating a static surge protection device having an alternative circuit arrangement for the static surge protection circuit shown in FIG. 3.

FIG. 4 shows a static surge protection device 2B having a surge protection circuit 22B that is an alternative to the circuit arrangement for surge protection circuit 22A shown in FIG. 3. In this regard, circuit 22B has the same components as circuit 22A, except that the polarities of thyristors 31 and 32 are reversed and the locations of diodes 50a and 50b are exchanged (thereby reversing polarities). As a consequence, current flow path A flows through diode 50a and varistors 40b and 42b, and flow path B flows through diode 50b and varistors 40a and 42a, as illustrated in FIG. 4.

Figure 5:
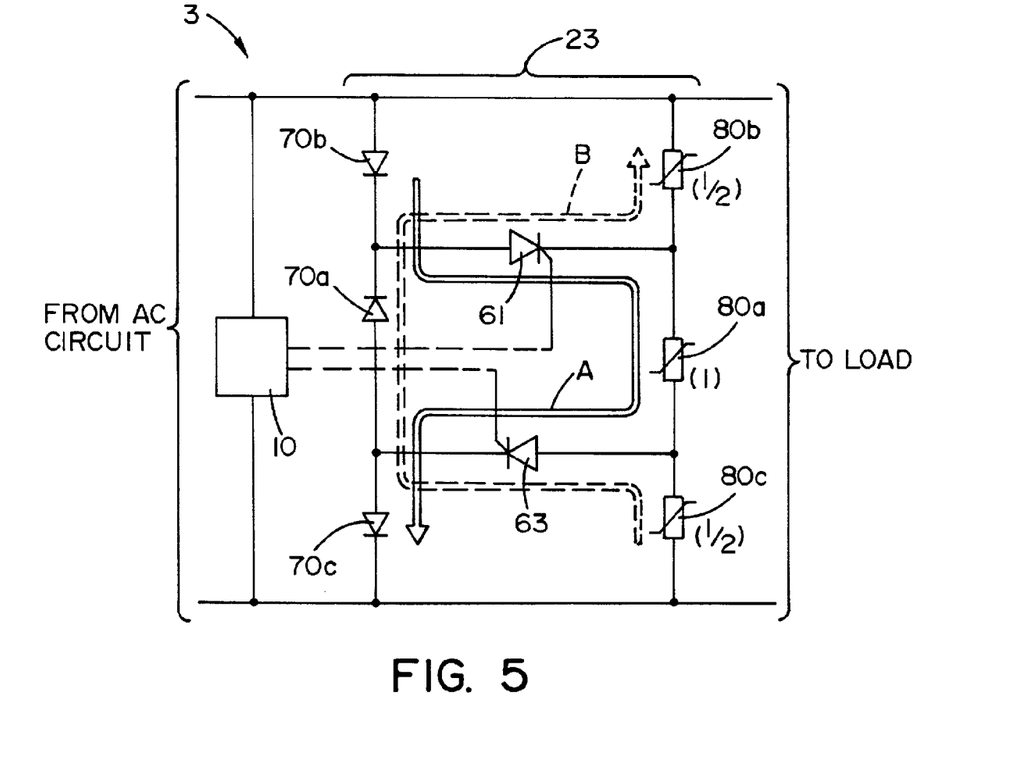
FIG. 5 is a schematic illustrating a static surge protection device having a surge protection circuit according to a third embodiment.

Referring now to FIG. 5, there is shown a static surge protection device 3 comprising a driver circuit 10 and a surge protection circuit 23 according to a third embodiment. Circuit 23 is generally comprised of series-connected varistors 80a, 80b and 80c, series-connected diodes 70a, 70b and 70c, and switching elements in the form of thyristors 61 and 62. Diode 70a is connected with a polarity opposite to the polarity of diodes 70b and 70c. Thyristors 61 and 62 are connected in parallel between varistors 80a-80c and diodes 70a-70c. More specifically, thyristor 61 is connected at a first end between diodes 70a and 70b, and connected at a second end between varistors 80*a* and 80*b*. In the illustrated embodiment, varistors 80*b* and 80*c* each have a maximum continuous voltage rating generally equal to one-half the maximum continuous voltage rating of varistor 80*a*. All of the varistors 80*a*, 80*b* and 80*c* have the same peak current rating. Thus, varistor 80*b*, taken together with varistor 80*c*, provide a maximum continuous voltage rating approximately equal to the maximum continuous voltage rating of varistor 80*a* taken individually.

In the event of a positive voltage surge, driver circuit 10 turns on thyristors 61 and 62 causing current to conduct through diode 70*b*, thyristor 61, varistor 80*a* and diode 70*c*, as shown by current flow path A. Likewise, in the event of a negative voltage surge, driver circuit 10 turns on thyristors 61 and 62 causing current to conduct through diode 70*a* and series-connected varistors 80*c* and 80*b*, as shown by current flow path B. Since varistors 80*b* and 80*c* each have a maximum continuous voltage rating generally equal to one-half the maximum continuous voltage rating of varistor 80*a*, the total maximum continuous voltage rating of varistors 80*b* and 80*c*, taken together, is approximately equal to the maximum continuous voltage rating of varistor 80*a*, taken individually. When the current flowing through thyristors 31 and 32 is at or near zero, thyristors 31 and 32 automatically turn off, and the AC circuit again "sees" varistors 80*b*, 80*a* and 80*c* connected in series. The foregoing configuration results in less stress on the varistors, since varistor 80*a* is only activated during a positive voltage surge, and varistors 80*b* and 80*c* are only activated during a negative voltage surge. Accordingly, not all of the varistors 80*a*, 80*b* and 80*c* are activated each time there is a voltage surge, thus minimizing the number of stress-inducing activation cycles for individual varistors.

Figure 6:
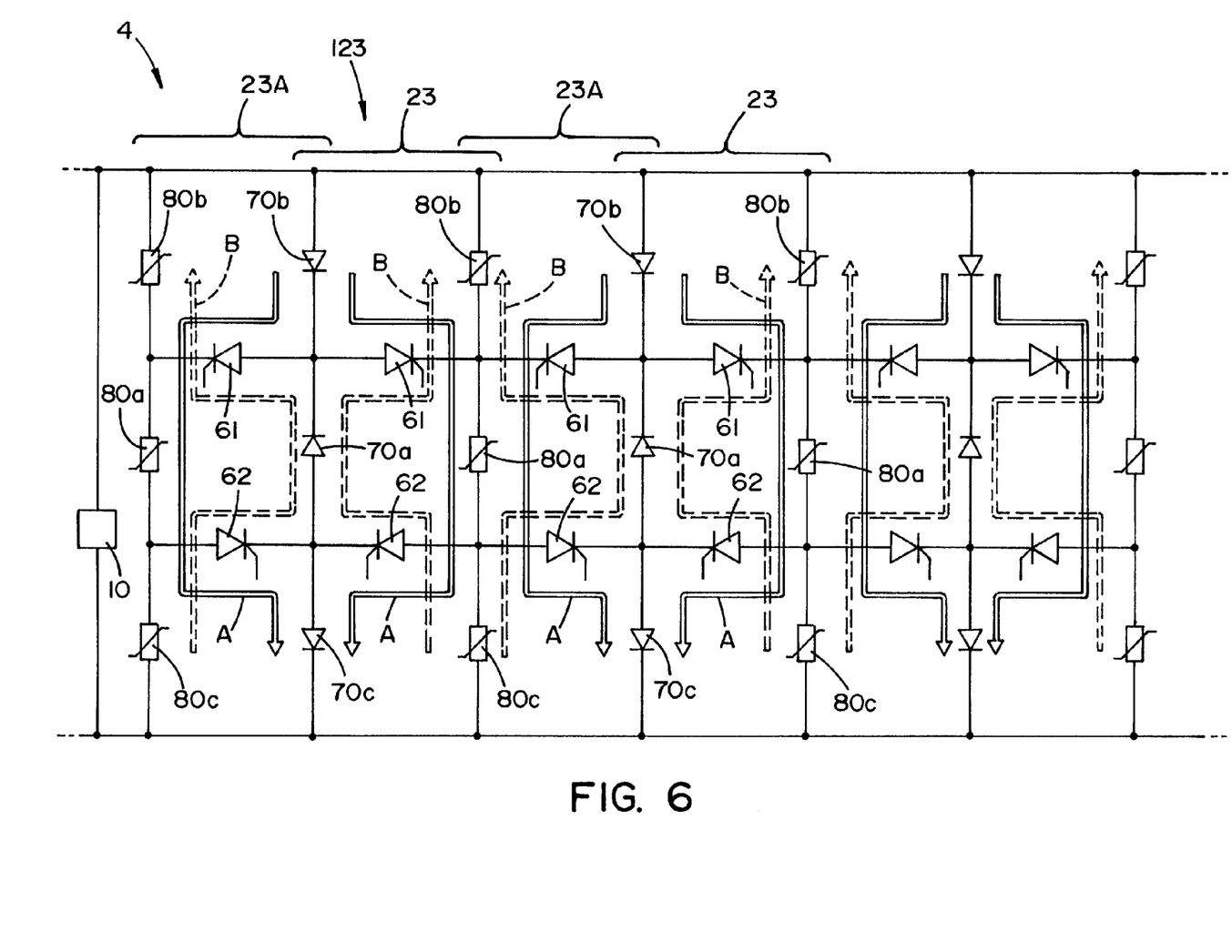
FIG. 6 is a schematic illustrating a static surge protection device having a surge protection circuit according to a fourth embodiment, wherein the fourth embodiment is an expanded version of the third embodiment to provide increased energy dissipation capacity.

FIG. 6 shows a schematic illustrating a surge protection circuit 123 according to a fourth embodiment. Circuit 123 is an expanded version of circuit 23 (see FIG. 5), and thus provides increased energy dissipation capacity. A static surge protection device 4 is comprised of circuit 123 and an associated switch driver circuit 10.

Circuit 123 is an association of circuits 23 described above. In particular, circuit 123 is comprised of a plurality of circuits 23 "overlapping" with a plurality of adjacent mirrored circuits 23 (labeled as circuits 23A in FIG. 6). In other words, circuit 123 is comprised of a series of alternating circuits 23 and circuits 23A, wherein adjacent circuits 23 and circuits 23A share series-connected diodes 70*a*, 70*b*, 70*c* or varistors 80*a*, 80*b*, 80*c*.

During normal operating conditions, the AC circuit "sees" the series-connected varistors 80*b*, 80*a* and 80*c* of each circuit 23 and 23A in parallel. In the event of a positive voltage surge, driver circuit 10 turns on all thyristors 61 and 62 of circuit 123, thereby causing current to conduct through diodes 70*b*, thyristors 61 and 62, varistors 80*a* and diodes 70*c*, as shown by current flow paths A. Likewise, in the event of a negative voltage surge, driver circuit 10 turns on all thyristors 61 and 62 of circuit 123, thereby causing current to conduct through varistors 80*c*, 80*b*, thyristors 61, 62, and diodes 70*a*, as shown by current flow paths B. When the current flowing through thyristors 61 and 62 is at or near zero, thyristors 61 and 62 automatically turn off, and the AC circuit again "sees" the plurality of series-connected varistors 80*b*, 80*a* and 80*c* of circuit 123.

Circuit 123 increases the number of varistors as compared to circuit 23 taken alone (FIG. 5). Accordingly, circuit 123 dissipates more energy (i.e., higher voltage) during a voltage surge. Moreover, circuit 123 puts less stress on the varistors, since current flow paths A and B respectively provide parallel current flow paths in response to positive and negative voltage surges, thereby dividing the surge current among multiple varistors during an overvoltage event.

Figure 7:
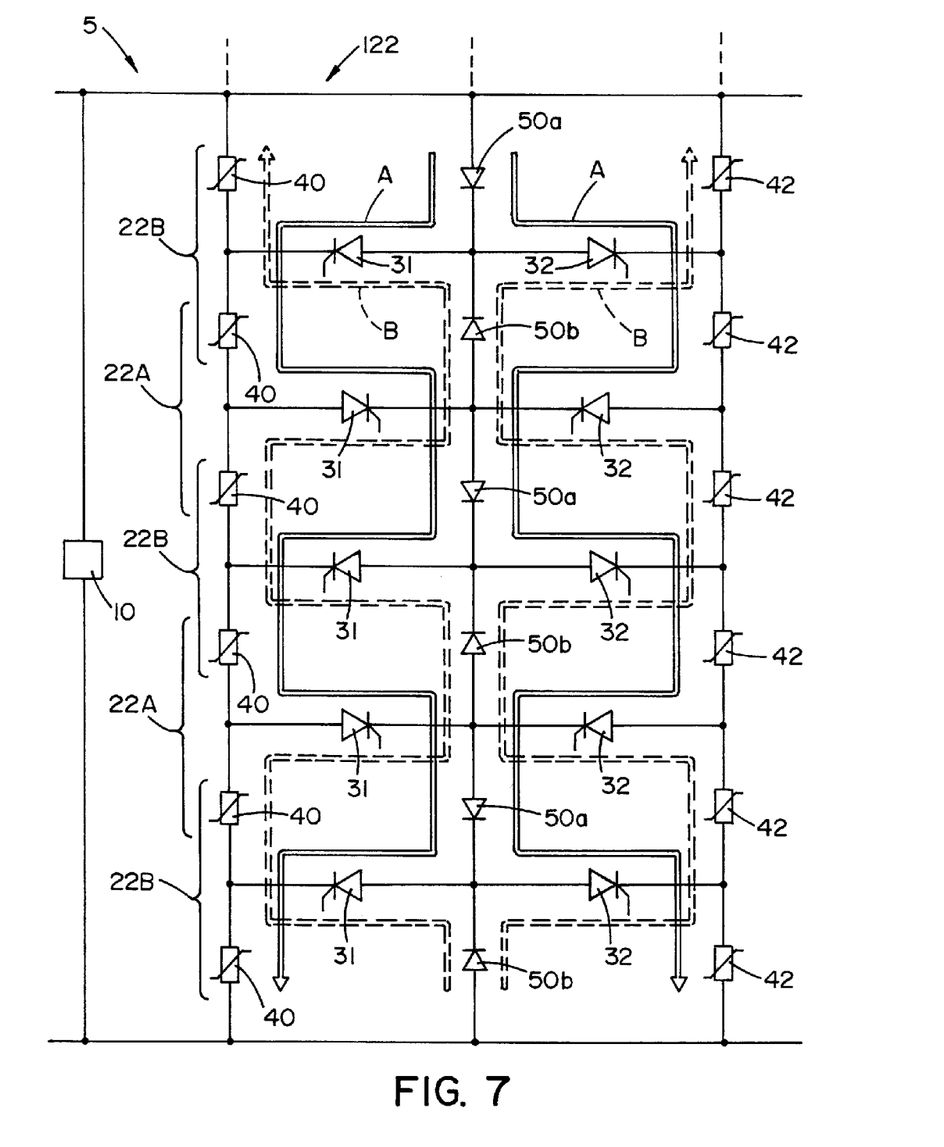
FIG. 7 is a schematic illustrating a static surge protection device having a surge protection circuit according to a fifth embodiment, wherein the fifth embodiment is an expanded version of the alternative arrangement of the second embodiment shown in FIG. 4, the fifth embodiment providing increased energy dissipation capacity.

FIG. 7 shows a schematic illustrating a static surge protection circuit 122 according to a fifth embodiment. Circuit 122 is basically an expanded version of circuits 22A and 22B (FIGS. 3 and 4), and thus provides increased energy dissipation capacity. A static surge protection device 5 is comprised of circuit 122 and an associated switch driver circuit 10.

Circuit 122 is basically an association of circuits 22A and 22B described above. In particular, circuit 122 is comprised of a plurality of circuits 22B overlapping with a plurality of adjacent circuits 22A, as shown in FIG. 7. In other words, circuit 122 is comprised of a series of alternating circuits 22B and 22A, wherein adjacent circuits 22B and 22A share one varistor 40, one diode 50*a* or 50*b* and one varistor 42. During normal operating conditions, the AC circuit "sees" the series-connected varistors 40, and series-connected varistors 42 of circuit 22A and 22B.

In the event of a positive voltage surge, driver circuit 10 turns on all thyristors 31 and 32 of circuit 122, thereby causing current to conduct as shown by current flow paths A. Likewise, in the event of a negative voltage surge, driver circuit 10 turns on all thyristors 31 and 32 of circuit 122, thereby causing current to conduct as shown by current flow paths B. When the current flowing through thyristors 31 and 32 is at or near zero, thyristors 31 and 32 automatically turn off, and the AC circuit again "sees" the plurality of series-connected varistors 40 and series-connected varistors 42, in parallel.

In the embodiment illustrated in FIG. 7 there are six (6) series-connected varistors 40, and six (6) series-connected varistors 42. Accordingly, when all thyristors 31 and 32 are turned ON, current conducts through three (3) series connected varistors 40 and three (3) series-connected varistors 42. When all thyristors 31 and 32 are turned OFF, the AC circuit "sees" six (6) series-connected varistors 40 in parallel with six (6) series-connected varistors 42. Therefore, expanding circuit 122 to N series-connected varistors 40 and N series-connected varistors 42, with all thyristors 31 and 32 are turned ON, current conducts through N/2 series-connected varistors 40 and N/2 series-connected varistors 42. When all thyristors 31 and 32 are turned OFF, the AC circuit "sees" N series-connected varistors 40 in parallel with N series-connected varistors 42.

Circuit 122 increases the number of varistors as compared to circuits 22A and 22B, shown respectively in FIGS. 3 and 4. Accordingly, circuit 122 dissipates more energy (i.e., higher voltage) during a voltage surge. Moreover, circuit 122 puts less stress on the varistors, since current flow paths A and B respectively provide parallel current flow paths in response to positive and negative voltage surges, thereby dividing the surge current among multiple varistors during an overvoltage event.

It should be understood that for each embodiment described above it is contemplated that the surge protection circuits may be expanded to accommodate additional varistors. Moreover, the maximum continuous voltage rating of each varistor may be selected to achieve a desired level of surge protection.

The foregoing description discloses specific embodiments of the present invention. It should be appreciated that these embodiments are described for purposes of illustration only, and that numerous alterations and modifications may be practiced by those skilled in the art without departing from the spirit and scope of the invention. It is intended that all such Having described the invention, the following is claimed:

1. A surge protection device comprising:
    a surge protection circuit including:
        a first pair of series-connected varistors;
        a first pair of series-connected diodes, wherein said pair of diodes are connected with opposite polarity; and
        a first switching element connected at a first end between the first pair of series-connected varistors and at a second end between the first pair of series-connected diodes.

2. A surge protection device according to claim 1, wherein said first switching element permits current flow in a direction from the first end to the second end of the first switching element, when said first switching element is activated.

3. A surge protection device according to claim 1, wherein said first switching element is a thyristor-type semiconductor.

4. A surge protection device according to claim 1, wherein said device further comprises:
    a driver circuit for activating said first switching element in response to a voltage surge.

5. A surge protection device according to claim 1, wherein said surge protection circuit further comprises:
    a second pair of series-connected varistors; and
    a second switching element connected at a first end between the first pair of series-connected diodes and at a second end between the second pair of series-connected varistors.

6. A surge protection device according to claim 5, wherein
    said first switching element permits current flow in a direction from the first end to the second end of the first switching element, when said first switching element is activated; and
    said second switching element permits current flow in a direction from the second end to the first end of the second switching element, when said second switching element is activated.

7. A surge protection device according to claim 5, wherein
    said first switching element permits current flow in a direction from the second end to the first end of the first switching element, when said first switching element is activated; and
    said second switching element permits current flow in a direction from the first end to the second end of the second switching element, when said second switching element is activated.

8. A surge protection device according to claim 5, wherein said second switching element is a thyristor-type semiconductor.

9. A surge protection device according to claim 5, wherein said device further comprises:
    a driver circuit for activating said first and second switching elements in response to a voltage surge.

10. A surge protection device comprising:
    a first surge protection circuit including:
        three series-connected varistors;
        first, second and third series-connected diodes, wherein second series connected diode is connected at a first end to the first series-connected diode and connected at a second end to the third series connected diode, said second series-connected diode having a polarity opposite the polarity of said first and third series-connected diodes;
        a first switching element connected at a first end between the first and second series-connected diodes and connected at a second end between the first and second series-connected varistors; and
        a second switching element connected at a first end between the second and third series-connected varistors and connected at a second end between the second and third series-connected diodes.

11. A surge protection device according to claim 10, wherein said first and third series-connected varistors have one-half the maximum continuous voltage rating of the second series-connected varistor.

12. A surge protection device according to claim 10, wherein
    said first switching element permits current flow in a direction from the first end to the second end of the first switching element, when said first switching element is activated; and
    said second switching element permits current flow in a direction from the first end to the second end of the second switching element, when said second switching element is activated.

13. A surge protection device according to claim 10, wherein said device further comprises:
    a driver circuit for activating said first and second switching elements in response to a voltage surge.

14. A surge protection device according to claim 10, said device further comprising:
    a second surge protection circuit that is a mirror of said first surge protection circuit.

15. A surge protection device according to claim 14, wherein, said second surge protection circuit is located adjacent to said first surge protection circuit and shares said first, second and third series-connected diodes or said first, second and third series-connected varistors.

16. A surge protection device according to claim 14, wherein said device comprises a plurality of alternating first and second surge protection circuits, wherein
    adjacent first and second surge protection circuits share first, second and third series-connected diodes or first, second and third series-connected varistors.

17. A surge protection device according to claim 14, wherein said first and third series-connected varistors have half the maximum continuous voltage rating of the second series-connected varistor.

18. A surge protection device according to claim 14, wherein said device further comprises:
    a driver circuit for activating said first and second switching elements of said first and second surge protection circuits in response to a voltage surge.

19. A surge protection device comprising:
    a first surge protection circuit including:
        a first pair of series-connected varistors;
        a second pair of series-connected varistors;
        a first pair of series-connected diodes, wherein said pair of diodes are connected with opposite polarity;
        a first switching element connected at a first end between the first pair of series-connected varistors and at a second end between the first pair of series-connected diodes; and
        a second switching element connected at a first end between the first pair of series-connected diodes and at a second end between the second pair of series-connected varistors, wherein the first and second switching elements have opposite polarity; and
    a second surge protection circuit including:
        a first pair of series-connected varistors;
        a second pair of series-connected varistors;
        a first pair of series-connected diodes, wherein said first pair of diodes are connected with opposite polarity and have a polarity that is reverse of said first pair of diodes of said first surge protection circuit;

a first switching element connected at a first end between the first pair of series-connected varistors and at a second end between the first pair of series-connected diodes; and a second switching element connected at a first end between the first pair of series-connected diodes and at a second end between the second pair of series-connected varistors, wherein the first and second switching elements have opposite polarity, and a polarity reverse of said first and second switching elements of said first surge protection circuit, wherein a plurality of said first protection circuits connected in an alternating fashion with a plurality of second surge protection circuits, wherein adjacent first and second surge protection circuits share one of said varistors of said first pair of series-connected varistors, one of said varistors of said second pair of series-connected varistors, and one of said diodes of said first pair of series-connected diodes.

20. A surge protection device according to claim 19, wherein said device further comprises:

a driver circuit for activating said first and second switching elements of said first and second surge protection circuits in response to a voltage surge.

\* \* \* \* \*